United States Patent
Highnam et al.

(10) Patent No.: US 10,496,924 B1
(45) Date of Patent: Dec. 3, 2019

(54) DICTIONARY DGA DETECTOR MODEL

(71) Applicant: CAPITAL ONE SERVICES, LLC, McLean, VA (US)

(72) Inventors: Kate Highnam, Falls Church, VA (US); Domenic Vincent Puzio, Arlington, VA (US); Song Luo, Potomac, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/057,804

(22) Filed: Aug. 7, 2018

(51) Int. Cl.
*G06N 3/08* (2006.01)

(52) U.S. Cl.
CPC ..................... *G06N 3/08* (2013.01)

(58) Field of Classification Search
CPC .. H04L 61/1511; G06N 20/00; G06N 3/0445; G06N 3/08
See application file for complete search history.

(56) References Cited

U.S. PATENT DOCUMENTS

| | | | | |
|---|---|---|---|---|
| 9,690,938 B1* | 6/2017 | Saxe | ...................... | G06F 21/563 |
| 2018/0288086 A1* | 10/2018 | Amiri | ................. | H04L 63/1425 |
| 2018/0351972 A1* | 12/2018 | Yu | ........................ | H04L 63/1416 |

OTHER PUBLICATIONS

R. Vinayakumar, Prabaharan Poornachandran, and K. P. Soman, "Scalable Framework for Cyber Threat Situational Awareness Based on Domain Name Systems Data Analysis", May 3, 2018, Big Data in Engineering Applications, Studies in Big Data 44, pp. 113-142. (Year: 2018).*

Jonathan Woodbridge, Hyrum S. Anderson, Anjum Ahuja, and Daniel Grant, "Predicting Domain Generation Algorithms with Long Short-Term Memory Networks," Nov. 2, 2016, arXiv, pp. 1-13. (Year: 2016).*

Pierre Lison and Vasileios Mavroeidis, "Automatic Detection of Malware-Generated Domains with Recurrent Neural Models", Sep. 20, 2017, arXiv, pp. 1-12. (Year: 2017).*

Vysakh S Mohan, Vinayakumar R, Soman K P, and Prabaharan Poornachandran, "S.P.O.O.F Net: Syntactic Patterns for identification of Ominous Online Factors", May 24, 2018, 2018 IEEE Symposium on Security and Privacy Workshops, pp. 258-263. (Year: 2018).*

Bin Yu, Daniel L. Gray, Jie Pan, Martine De Cock, and Anderson C. A. Nascimento, "Inline DGA Detection with Deep Networks", 2017, 2017 IEEE International Conference on Data Mining Workshops, pp. 683-692. (Year: 2017).*

(Continued)

*Primary Examiner* — Kamran Afshar
*Assistant Examiner* — Ying Yu Chen
(74) *Attorney, Agent, or Firm* — Finnegan, Henderson, Farabow, Garrett & Dunner, LLP

(57) ABSTRACT

Systems and methods are provided for detecting dictionary domain generation algorithm domain names using deep learning models. The system and method may comprise training and applying a model comprising a long short-term memory network, a convolutional neural network, and a feed forward neural network that accepts as input an output from the long short-term memory network and convolutional neural network. The system and method may provide a score indicating the likelihood that a domain name was generated using a dictionary domain generation algorithm domain name. The system and method may be provided as a service.

19 Claims, 9 Drawing Sheets

(56) References Cited

OTHER PUBLICATIONS

Jonathan Woodbridge, Hyrum S. Anderson, Anjum Ahuja, and Daniel Grant, "Predicting Domain Generation Algorithms with Long Short-Term Memory Networks," Arlington, VA 22201, Nov. 2, 2016, 13 pages, https://arxiv.org/pdf/1611.00791.pdf, accessed Aug. 1, 2018.

Joshua Saxe and Konstantin Berlin, "eXpose: A Character-Level Convolutional Neural Network with Embeddings for Detecting Malicious URLs, File Paths and Registry Keys." Feb. 27, 2017, 18 pages, https://arxiv.org/pdf/1702.08568v1.pdf, accessed Aug. 1, 2018.

Kate Highnam and Domenci Puzio, "Deep Learning for Real-Time Malware Detection," Australian Cyber Security Conference, Canberra, Australia, Apr. 11, 2018, 1 page, https://acsc2018.com.au/wp-content/uploads/2018/02/KateHighnamDomenicPuzio.pdf, accessed Aug. 7, 2018.

Domenic Puzio and Kate Highnam, "Deep Learning for Realtime Malware Detection," ShmooCon XIV, Jan. 11, 2018, Washington, D.C., 72 pages, http://shmoocon.org/speakers/, accessed Aug. 7, 2018.

Domenic Puzio and Kate Highnam, "Deep Learning for Real Time Malware Detection," Jan. 11, 2018, 78 pages, (video available at https://archive.org/details/Shmoocon2018/Shmoocon2018-DeepLearningForRealtimeMalwareDetection.mp4), accessed Aug. 7, 2018.

Puzio and Kate Highnam, "Realtime Malware Detection with CNNs and LSTMs," Jun. 6, 2018, 12 pages, https://www.deeplearningworld.com/las-vegas/2018/agenda/?rmid=session52421#s-session52421, accessed Aug. 7, 2018.

Domenic Puzio and Kate Highnam, "Deep Learning for Real Time Malware Detection," Jun. 6, 2018, 98 pages. Reference (A).

Domenic Puzio and Kate Highnam, "Deep Learning for Real Time Malware Detection," Apr. 11, 2018, 98 pages Reference (B).

* cited by examiner

100

| Legitimate | Malicious |
|---|---|
| Top Domains from Public Site | Reverse-Engineered Dictionary DGA Families |
| computerco | lookhurt |
| jobfinder | threetold |
| paymentsite | threewear |
| moviesite | pielivingbytes |
| computeradvice | awardsbookcasio |
| citynews | blanketcontent |
| socialmediasite | bottomconcerned |
| chatsite | degreeblindagent |
| listentomusicstream | lineknitcalculators |
| | mistakelivegarage |

FIG. 1

DICTIONARY DGA DETECTOR MODEL

TECHNICAL FIELD

The present disclosure provides a system and method for building and using a model to detect dictionary domain generation algorithm names, and a system and method of implementing the model as a service.

BACKGROUND

Dictionary domain generation algorithms (DGAs) are computerized algorithms that randomly concatenate words found in English dictionaries or other dictionaries to create new internet domain names. Dictionary DGAs are used in a variety of contexts, including electronic advertising networks and malware.

Malware is any software, script, or program that is designed to damage a computer or network by, for example, disrupting computing functions, performing a denial of service, destroying data, redirecting internet traffic, sending spam, stealing data, or performing other malicious activities. Malware is often installed on a computer or device automatically, without user knowledge. Typical attack methods include viruses, phishing emails, worms, or bots launched through a network.

Networks may involve hundreds or thousands or devices accessing tens of thousands or even millions of websites per day. In environments containing a high volume of requests to visit websites, where any site is potentially malicious, providing real-time network security is a challenge. Network administrators may lack the resources to address this problem and look to services that provide security from malware.

To install malware, an internet domain name may be sent to a device and, when the device accesses the domain name, malware may automatically download and install onto the device. Some types of malware may then contact a command and control network located at the same internet domain or another internet domain, receive instructions from the command and control network, and perform malicious activities.

Some malware leads users to domains whose domain name comprises randomly generated strings of unrelated characters, i.e. character-based DGAs. Such DGAs may use randomization seeds to generate these names in real time. Character-based DGA domain names may be easily spotted by a human user as potentially unsafe or may be easily detected by models.

Other malware may use dictionary DGAs. As compared to character-based DGA domain names, dictionary DGA domain names are harder for human users to identify as potentially unsafe. As an example, a dictionary DGA may perform a randomization process to identify the words "look" and "hurt," then combine these words to generate "lookhurt.com." Dictionary DGA domain names may appear to be authentic to unsuspecting users because component words may be related to each other, related to known concepts, related to real events, or related to other aspects of the real world. Dictionary DGAs may have varying levels of sophistication to lure users into visiting these websites.

Dictionary DGA domain names present challenges to network administrators. Conventional approaches to detecting dictionary DGA domain names are inaccurate, and, hence, services that are available to network administrators may be unable to provide adequate security.

Conventional approaches to network security from malware that use DGAs may involve reverse engineering a piece of malware and identifying its respective DGA and the seed. Other conventional approaches may involve developing blacklists, i.e. preventing network users from accessing domains listed in lists of known malicious sites. Blacklisting and reverse engineering may be slow or infeasible. While various groups or agencies may share blacklists or the results of reverse engineering to increase a pool of known malicious sites, these approaches have limited efficacy in preventing users from accessing unknown malicious sites. The status of a site as either malicious or benign may change; previously malicious sites may become benign, and static blacklists may not keep pace with changes. Further, new DGA domain names may be generated nearly instantaneously in bulk, producing hundreds to tens-of-thousands per day by a single malware sample, easily outpacing the rate at which malware may be reverse engineered or at which blacklists may grow.

Another conventional approach to detecting DGAs may involve making predictions based on models. For example, random forest classifiers and clustering techniques may be used. These conventional approaches require identifying manually-selected features, such as entropy, string length, vowel to consonant ratio, the number of English words present in the domain, or the like. Other conventional approaches involve using natural language models. Conventional approaches based on random forest models, clustering models, or natural language models made to target generic DGA domains have some success predicting character-based DGA domain names, but have not been shown to perform well when predicting dictionary DGA domain names.

In view of the shortcomings of current systems and methods for detecting dictionary DGA domain names, an unconventional method with improved accuracy, flexibility, and ability to handle high-volume requests is desired. Further, because conventional approaches are inaccurate, and because many network administrators lack the resources to address dictionary DGAs on their own, there is a need for accurate dictionary DGA detection as a service.

SUMMARY

The disclosed embodiments provide methods and systems comprising deep learning models to detect domain names generated by dictionary domain generation algorithms. In particular, the disclosed unconventional systems and methods provide improvements over conventional systems and methods for detecting dictionary DGAs that are more accurate and may be provided as a service to a wide group of users.

Consistent with the present embodiments, a system for detecting DGA domain names is disclosed. The system may comprise a memory storing instructions and one or more processors. The one or more processors may be configured to execute the stored instructions to receive a plurality of training domain names, each comprising a corresponding sequence of characters. The instructions may comprise receiving a plurality of labels respectively corresponding to the plurality of training domain names, each comprising a corresponding sequence of characters. Further, the instructions may comprise generating a plurality of sequences of dense embedding vectors. Each dense embedding vector may correspond to one of the training domain names and be based on a sequence of characters corresponding to the training domain name. In some embodiments, the instructions comprise generating a plurality of multilayer perceptron (MLP) node outputs by iteratively performing optimization steps.

The optimization steps may comprise generating, using a long short-term memory model, a plurality of neural node outputs based on the plurality of sequences of dense embedding vectors and the plurality of labels. The optimization steps may further comprise generating, using a convolutional neural network model, a plurality of filter outputs based on the plurality of sequences of dense embedding vectors and the plurality of labels. In some embodiments, the optimization steps comprise generating, using a feedforward neural network model, the plurality of MLP node outputs based on the neural node outputs and the filter outputs, and determining an accuracy score of the MLP node outputs. In some embodiments, the optimization steps comprise, based on the determined accuracy score and a threshold, performing one of terminating the iteratively performed optimization steps; or modifying at least one of the long short-term memory model, the convolutional neural network model, or the feedforward neural network model.

In some embodiments, the instructions comprise receiving a suspect domain name and providing a dictionary domain generation algorithm score based on the plurality of MLP node outputs and the suspect domain name.

Consistent with the disclosed embodiments, a method is disclosed. The method may comprise receiving a plurality of training domain names, each comprising a corresponding sequence of characters. The method may comprise receiving a plurality of labels respectively corresponding to the plurality of training domain names, each comprising a corresponding sequence of characters. Further, the method may comprise generating a plurality of sequences of dense embedding vectors. Each dense embedding vector may correspond to one of the training domain names and be based on a sequence of characters corresponding to the training domain name. In some embodiments, the method comprises generating a plurality of multilayer perceptron (MLP) node outputs by iteratively performing optimization steps.

The optimization steps may comprise generating, using a long short-term memory model, a plurality of neural node outputs based on the plurality of sequences of dense embedding vectors and the plurality of labels. The optimization steps may further comprise generating, using a convolutional neural network model, a plurality of filter outputs based on the plurality of sequences of dense embedding vectors and the plurality of labels. In some embodiments, the optimization steps comprise generating, using a feedforward neural network model, the plurality of MLP node outputs based on the neural node outputs and the filter outputs, and determining an accuracy score of the MLP node outputs. In some embodiments, the optimization steps comprise, based on the determined accuracy score and a threshold, performing one of terminating the iteratively performed optimization steps; or modifying at least one of the long short-term memory model, the convolutional neural network model, or the feedforward neural network model.

In some embodiments, the method comprises receiving a suspect domain name and providing a dictionary domain generation algorithm score based on the plurality of MLP node outputs and the suspect domain name.

Consistent with embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 1 is an illustration of legitimate and malicious domain names.

DESCRIPTION OF THE EMBODIMENTS

The disclosed embodiments are directed to systems and methods for detecting dictionary domain generation algorithm (DGA) domain names. In particular, disclosed systems and methods comprise an unconventional deep learning model for real time malware detection by providing a dictionary DGA score suspect domain names. Deep learning models use networks to learn relationships among features to classify data points. Deep learning models are highly flexible, do not require manually selected features, and may generate predictions in real time. In the embodiments, the deep learning model may comprise the combination of a Long Short-Term Memory (LS™) network, a Convolutional Neural Network (CNN) model, and an multilayer perceptron (basic neural network) model to score suspect domain names in real time. The unconventional systems and methods disclosed perform better than conventional methods when detecting dictionary DGAs and are flexible and scalable.

Reference will now be made in detail to exemplary embodiments, examples of which are illustrated in the accompanying drawings and disclosed herein. Wherever convenient, the same reference numbers will be used throughout the drawings to refer to the same or like parts.

FIG. 1 presents illustration 100 of legitimate and malicious domain names. Legitimate and malicious domain names in FIG. 1 are hypothetical examples and presented for purposes of illustration only. Lists of legitimate and malicious domain names may comprise any number of names including, for example, one million names each. As shown in FIG. 1, the legitimate domains names are not malware-generated domain names, while the malicious domain names are associated with families of dictionary DGA domain names. In some embodiments, lists like those presented in FIG. 1 are used to train deep learning models. For example, a list of legitimate domains may be obtained from a list of top domains given by a public server and given a label. The label may be a word like, for example, "legitimate," or the label may be a binary score of, for example, 0. The public server may provide, for example, Amazon Alexa's® top one million websites based on traffic statistics or the like. A list of malicious sites may be obtained by reverse engineering one or more examples of malware software, and the sites on list of malicious sites may be given a label. The label may be a word like, for example, "malicious," or the label may be a binary score of, for example, 1. The list of malicious sites may be posted on, for example, a public site.

Figure 2:
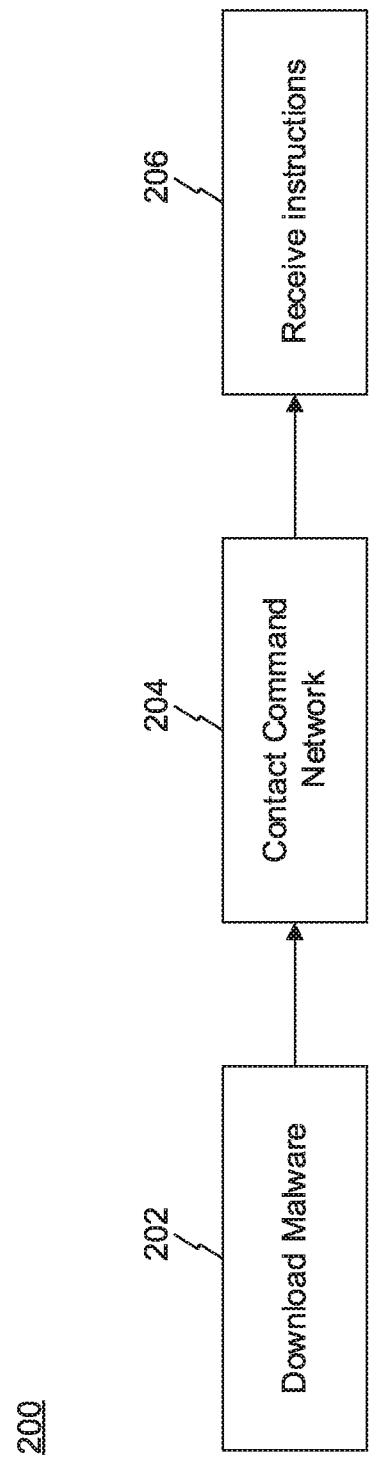
FIG. 2 is a diagram of an exemplary malware process.

FIG. 2 is a diagram of exemplary malware process 200. The owner of a command and control network can control large numbers devices running malware using process 200. In process 200, malware is downloaded onto a device connected to a network at step 202. The download may be associated with, for example, one of a phishing email, a virus, a worm, a botnet, or the like. Once downloaded, the malware is installed and, at step 204, the malware attempts to contact a command and control network. The command and control network may employ an Internet-based protocol to connect devices such as, for example, telnet, internet relay chat (IRC), a peer-to-peer protocol, or other Internet protocol. At step 206, the command and control network provides instructions to the malware. The instructions may be to perform at least one of disrupting computing functions, a denial of service, destroying data, redirecting internet traffic, sending spam, stealing data, or other malicious activities.

Consistent with disclosed embodiments, network traffic to a domain may be blocked at any of steps 202, 204, or 206 based on a dictionary DGA model score and a threshold.

Figure 3:
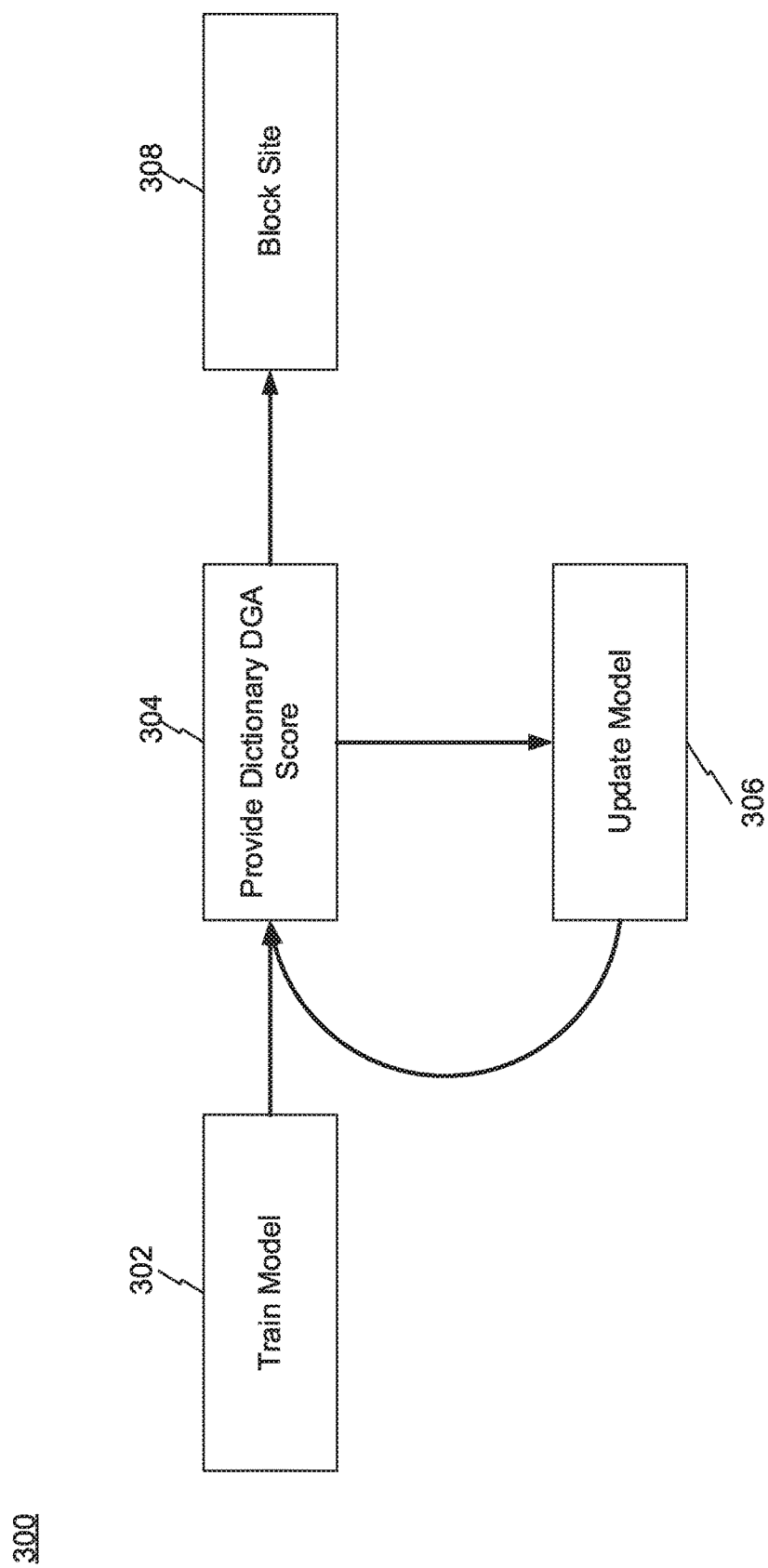
FIG. 3 is a flowchart for an exemplary process of training, deploying, and updating a dictionary domain generation algorithm model, consistent with disclosed embodiments.

FIG. 3 is a flowchart for an exemplary process 300 for training, deploying, and updating a deep learning dictionary domain generation algorithm model, consistent with disclosed embodiments. Process 300 may comprise training a deep learning model, providing a dictionary DGA score using a deep learning model, and updating a deep learning model. The deep learning model may comprise an LSTM network, a CNN model, and a multilayer perceptron (basic neural network) model, consistent with disclosures made in reference to FIG. 4. Process 300 may be performed by one or more network devices, user devices, servers, clusters, cloud services, or other systems running or accessing the deep learning model.

At step 302, in some embodiments, the system running the deep learning model trains the model to detect dictionary DGA domain names using a training dataset. During this iterative process, the deep learning model learns to predict dictionary DGA domain names. For example, the model may be given a list of legitimate domain names (negatives) and a list of dictionary DGA domain names (positives) as disclosed in reference to FIG. 1. Training may comprise splitting the total dataset into a training data subset and a testing and validation data subset using a random sampling technique. As an example, 80% of the total dataset may be used as a training data subset and 20% may be used as a testing and validation data subset, wherein each data subset comprising an approximately equal number of positives and negatives. At step 302, the model may be trained iteratively until an accuracy score is achieved when using the testing and validation data subset. At step 302, the model may be trained for a predetermined number of iterations.

In some embodiments, step 304 comprises providing a dictionary DGA score for a suspect domain name to a system running the deep learning model. As an example, a user may receive a suspect domain name in an email and submit this domain name to the system to obtain a dictionary DGA score that indicates the likelihood that the suspect is a dictionary DGA domain name. As another example, a network device may submit network logs to the system running the model. The logs may comprise a list of suspect domain names associated with devices on the network. In some embodiments the system returns a corresponding dictionary DGA score associated with one or more suspect domain names in the list. In some embodiments, step 304 is performed in real time. For example, the system running the deep learning model may receive a stream of network logs from a network device and return a stream of dictionary DGA scores from the model output.

In some embodiments, optional step 306 comprises updating the model. Updating the model may comprise performing further iterations of the model on the training dataset disclosed in reference to step 302. In some embodiments, updating the model comprises providing an additional or substitute training dataset to the model. In some embodiments, updating the model is performed based on at least one of a schedule, the identification of new dictionary DGA domains, or a test of the model. In some embodiments, updating the model is performed based on a visit to the suspect domain name submitted at step 304. For example, a user may visit the site, determine that the site is either legitimate or malicious, and provide feedback to a system running the model.

In some embodiments, optional step 308 comprises blocking the suspect domain based on the dictionary DGA domain name score generated at step 304. For example, a network device may submit, to the system running the deep learning model, a request to provide a dictionary DGA domain name score and receive a dictionary DGA domain name score in response to the request. At step 308, the network device or other network device may block network traffic to the domain associated with the suspect domain name. Blocking traffic may involve adding the suspect domain to a blacklist located on a network device like, for example, a database.

At step 308, the network device may take additional security measures based on a received dictionary DGA domain name score for a suspect domain name. For example, the network device may block all traffic to a network device associated with a suspect domain name. As another example, the network device may wipe a network device associated with a suspect domain name. As yet another example, the network device may freeze a user account associated with a suspect domain name. As one of skill in the art will appreciate, other security measures may be taken.

Figure 4:
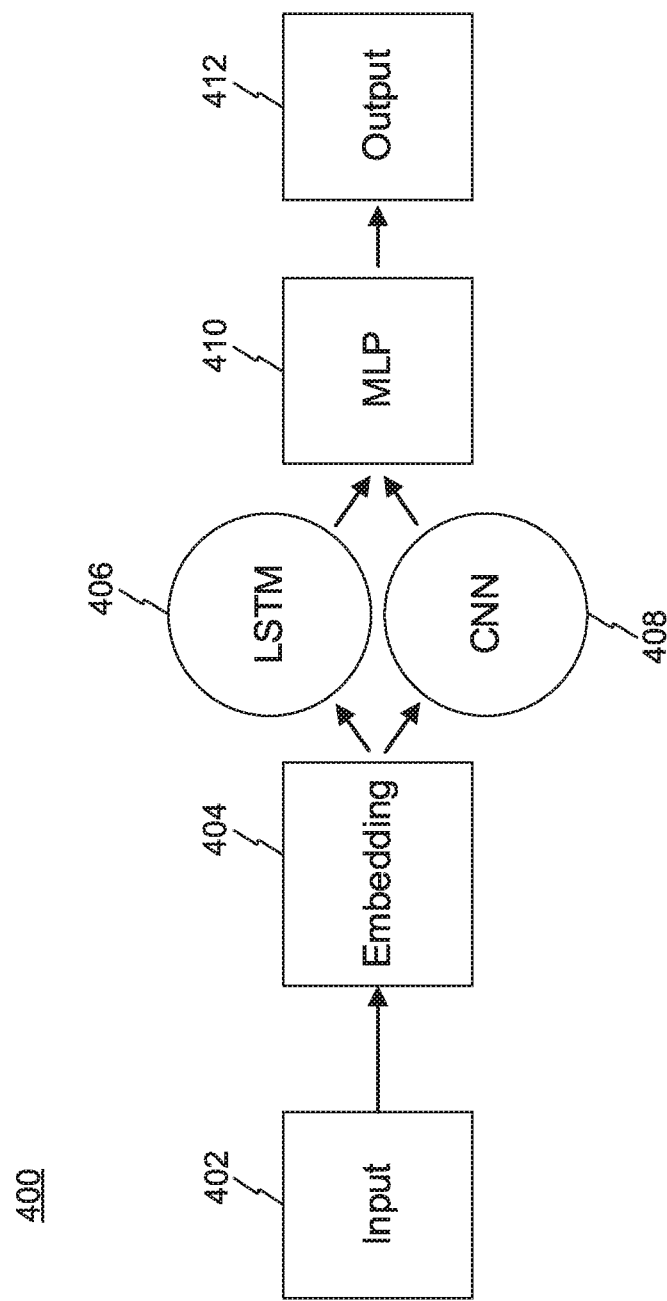
FIG. 4 is a flowchart of an exemplary process for detecting dictionary domain generation domain names, consistent with disclosed embodiments.

FIG. 4 is a flowchart of exemplary deep learning model 400 for detecting dictionary domain generation domain names, consistent with disclosed embodiments.

Consistent with disclosed embodiments, deep learning model 400 may be implemented on one of a user device, a server, a server cluster, a cloud server, or other computing system comprising one or more memory units for storing instructions and one or more processors for executing the stored instructions. In some embodiments, deep learning model 400 is implemented using distributed computing.

As will be apparent to one of skill in the art, deep learning model 400 may be built using publicly available application programming interfaces (APIs) designed for building neural networks including, for example, Keras®, Neural Designer®, Wolfram Mathematica®, Deep Learning Studio®, Caffe®, IBM Data Science Experience®, SignalBox®, or the like. Further, deep learning model 400 may be built by using machine learning tools like TensorFlow®, Microsoft Cognitive Toolkit (CNTK)®, or Theano®. Deep learning model may be built using R, PYTHON, SQL, SAS, JAVA, MATLAB, or other programming languages.

At step 402, deep learning model 400 is provided with input data. For example, input data may be a training dataset comprising a list of legitimate domain names and a list of malicious domain names with corresponding labels, as disclosed in reference to FIG. 1. In some embodiments, input data comprises a domain name and is provided to deep learning model 400 to obtain a dictionary DGA domain name score. That is, the input may be a suspect domain name. The score may indicate the likelihood that the domain name is a dictionary DGA domain name.

At step 404, input data are embedded by an embedding model layer. That is, at step 404, embed data are generated that encode strings of characters in a domain name as a sequence of vectors. At step 404, one or more domain names in the input data may be transformed into embedded data comprising a sequence of vectors, each vector having the same length, consistent with disclosures made in reference to FIG. 5. The embed data may have no inherent, human-understandable meaning but capture patterns and relationships of the strings of characters and express these patterns as vectors of numeric values.

In some embodiments, at step 404, the embedding model layer prepends or appends dummy characters to the beginning or end of a domain name to create a standardized domain name having a standard-length sequence. For example, the embedding layer within the model may append a string of zeros to the end of domain names that are shorter than a predetermined domain name length. In some embodiments, the predetermined domain name length is 63 characters, the maximum domain name permitted under international Internet standards.

In some embodiments, at step 404, consistent with the below discussion with respect to FIG. 5, for each character in the standardized domain name, the embedding layer transforms an unencoded character into a numeric value.

In some embodiments, the embedding layer further transforms the numeric value into a one-hot encoding vector, and then transforms the one-hot encoding vector into a dense embedding vector using, for example, machine learning. One-hot encoding may represent categorical data as a vector composed of 0s and 1s indicating whether a given category is present. As will be appreciated by one of skill in the art, other embedding processes are possible at step 404, consistent with disclosed embodiments.

As will be apparent to one of skill in the art, dummy characters or dummy vectors may be appended or prepended at any point during step 404.

Referring to FIG. 4, at step 406, embed data created at step 404 may be provided to an LSTM network. An LSTM network is a gated recurrent neural network. LSTM networks advantageously may handle long sequences and handle long-term sequential dependencies by preserving cell state over time. Domain names may be treated as a sequence of characters, and nodes in the LSTM network may make decisions about one element in the sequence based on what it has seen earlier in the sequence. An LSTM network may be trained to identify DGAs by providing a training dataset comprising known legitimate and known malicious or illegitimate sites. LSTMs may provide an estimate or score indicating the likelihood that a given domain name was produced using a DGA.

In some embodiments, step 406 is performed to train the LSTM network to predict dictionary DGAs. In some embodiments, step 406 is performed to obtain a dictionary DGA domain name score corresponding to a suspect domain name. Step 406 may comprise selecting a sequence of dense embedding vectors from among a plurality of sequences of dense embedding vectors generated at step 404. In some embodiments, only one sequence of dense embedding vectors is passed to the LS™ network at step 406, and the selected sequence of dense embedding vectors is that sequence. Step 406 may comprise identifying a label corresponding to the selected sequence of dense embedded vectors.

In some embodiments, the LSTM network of step 406 comprises creating one or more neural nodes, each comprising a cell. Each cell may comprise an initial cell state and a logic gate. In some embodiments, the number of neural nodes is more than 500. In some embodiments, step 406 may comprise, for each dense embedding vector in the selected sequence of dense embedding vectors, sequentially maintaining, forgetting, or changing the cell state based on the current cell state, the logic gate, and the dense embedding vector. In some embodiments, step 406 comprises generating a neural node output based on the cell state and the label corresponding to the selected sequence of dense embedding vectors.

Figure 6:
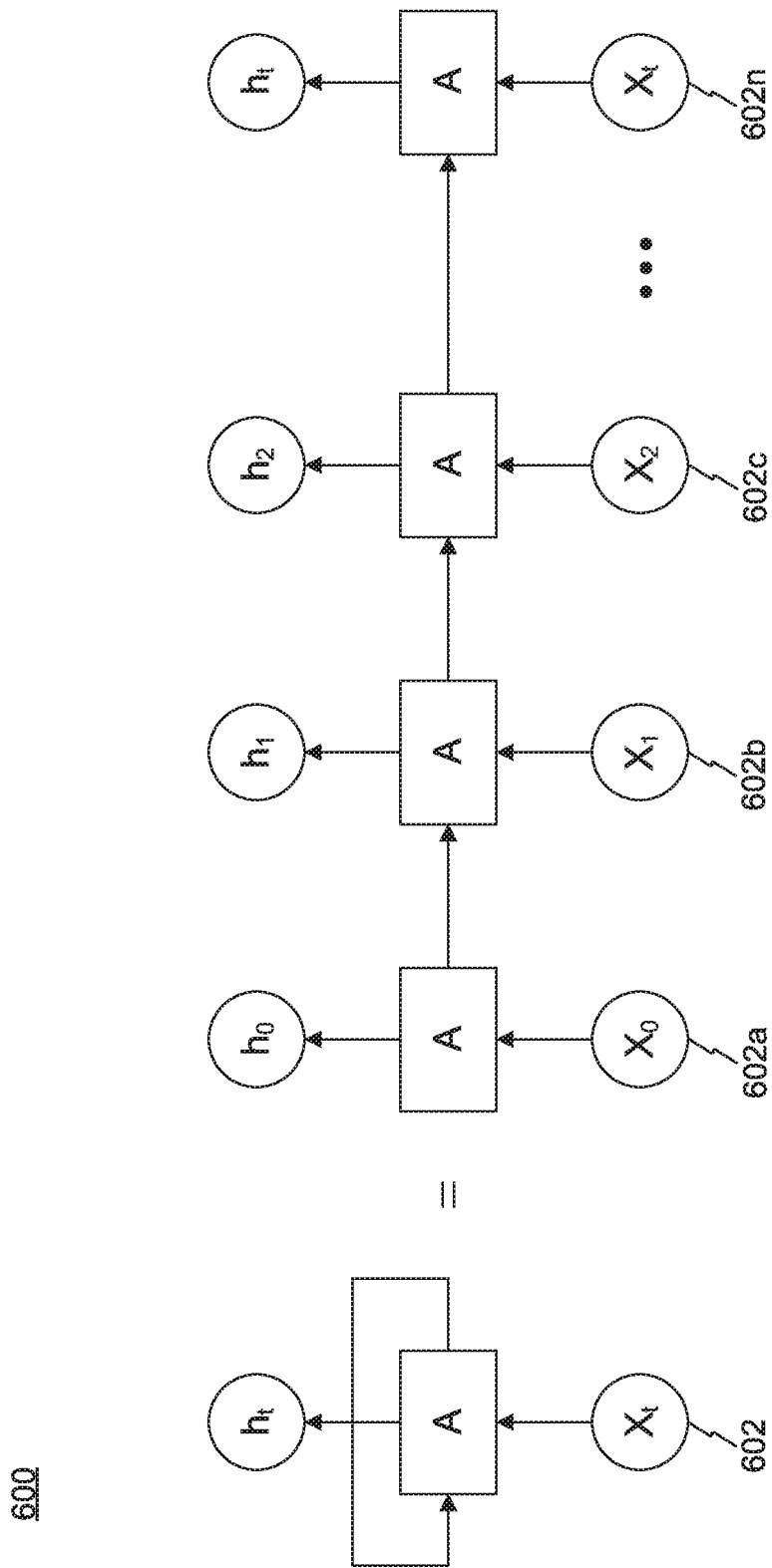
FIG. 6 is a flowchart of an exemplary process in a long short-term memory network for detecting dictionary domain generation algorithm domain names, consistent with disclosed embodiments.

The LSTM network of step 406 is consistent with disclosures made in reference to FIG. 6.

Referring to FIG. 4, at step 408, embedded data generated at step 404 may be provided to a CNN model, the embedded data comprising one or more sequences of dense embedding vectors. CNNs are designed to handle information organized into grids, like, for example, grids of pixels in an image. Domain names may be represented as a one-dimensional grid of characters and embedded as multi-dimensional vectors, with one vector per character. CNNs involve sliding multiple convolutional filter over vector sequences to find patterns in characters and extract features. The results of each filter are pooled and fed into fully connected layers to give an estimate or score indicating the likelihood that a given domain name was produced using a DGA.

In some embodiments, step 408 is performed to train the CNN model to predict dictionary DGAs. In some embodiments, step 408 is performed to obtain a dictionary DGA domain name score corresponding to a suspect domain name. Step 408 may comprise selecting a sequence of dense embedding vectors from among a plurality of sequences of dense embedded vectors.

Consistent with disclosed embodiments, step 408 may comprise employing a convolution layer, a nonlinear activation function layer, and a pooling layer. In some embodiments, step 408 may comprise creating a plurality of convolution filters, each convolution filter having a sliding window of a different fixed character length. Further, in some embodiments, step 408 may comprise generating, based on a plurality of sequences of dense embedding vectors and the plurality of labels, a plurality of convolution outputs corresponding to each convolution filter. Step 408 may comprise pooling the convolution outputs corresponding to each convolution filter, concatenating the pooled convolution outputs, and discarding a random subset of the concatenated convolution outputs based on a first dropout rate. A dropout rate is a predetermined proportion of outputs to discard and prevents overfitting data during training. In some embodiments, step 408 comprises generating a plurality of filter outputs using non-linear rectified linear unit activation on the concatenated convolution outputs, and discarding a random subset of the filter outputs based on a second dropout rate.

Figure 7:
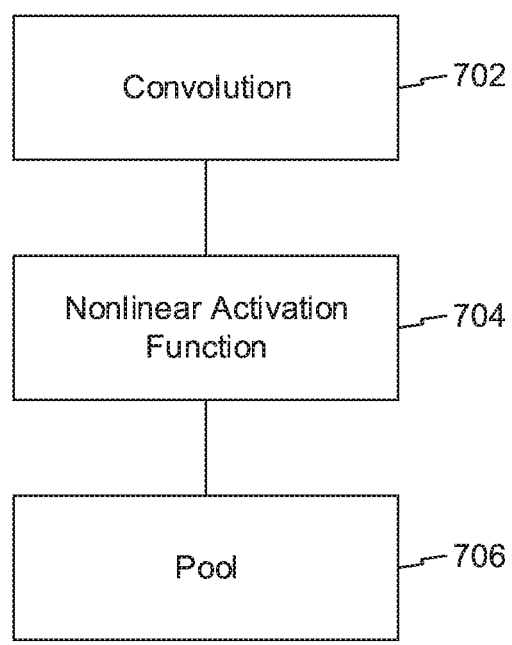
FIG. 7 is a flowchart of an exemplary process for detecting dictionary domain generation algorithm domain names using a convolutional neural network model, consistent with disclosed embodiments.
Figure 8:
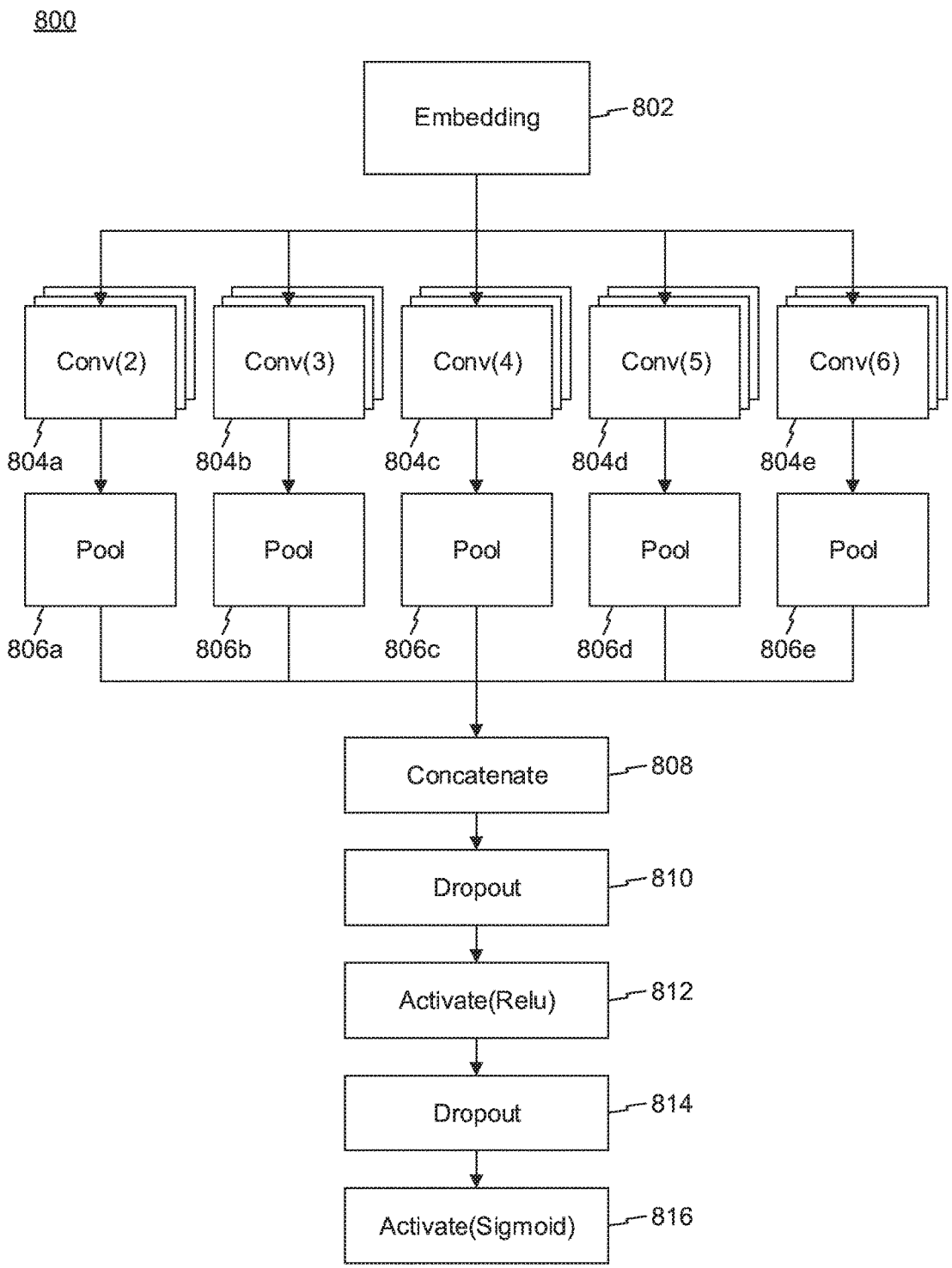
FIG. 8 is a flowchart of an exemplary process for detecting dictionary domain generation algorithm domain names using a convolutional neural network model, consistent with disclosed embodiments.

Further details of step 408 are provided in reference to FIG. 7 and FIG. 8.

As shown in FIG. 4, steps 406 and 408 may be performed as simultaneous, independent processes to tune the LSTM network and CNN model, respectively, and extract different features of dictionary DGA domain names.

Still referring to FIG. 4, step 410 comprises processing the features extracted by the LSTM network and the CNN model in a multilayer perceptron (MLP) model. In the MLP model of step 410, output from the LSTM network of step 406 and from the CNN model of step 408 are provided to the MLP model. The MLP model is a feed forward neural network and comprises three layers of nodes, including an input layer, a hidden layer, and an output layer. In some embodiments, the MLP model may comprise a plurality of hidden layers. The MLP model is fully connected. That is, each node in one layer connects to a node in the following layer. In some embodiments, the input layer comprises the LSTM network of step 406 and the CNN model of step 408.

In some embodiments, each layer of the MLP model of step 410 comprises a number nodes, each node corresponding to an output of the LSTM network or an output of the CNN component model. In some embodiments there are 100 or nodes at each layer of the MLP model of step 410. The nodes apply weights and an activation function to the neural node input. Consistent with disclosed embodiments, the MLP model of step 410 weights the features extracted by the LSTM network of step 406 and CNN model of step 408 to provide output based on an activation function and a weighted sum. Learning of the MLP model comprises changing weights and may comprise back-propagation techniques.

In some embodiments, step 410 is performed simultaneously to steps 406 and 408. That is, the MLP model of step 410 may be trained while the LSTM network of step 406 and CNN model of step 408 are being trained.

At step 412, deep learning model 400 provides one or more dictionary DGA scores based on the output of the MLP model. In some embodiments, the dictionary DGA score represents the likelihood that a suspect domain name was generated using a dictionary DGA. The dictionary DGA score may range, for example, between 0 and 1, with values closer to 1 indicating a higher likelihood that a suspect domain name is a dictionary DGA domain name. As an example, the output of the MLP model may span a range of negative and positive real numbers and be converted to the range [0, 1] by adding the minimum negative value of the range and dividing by the resulting maximum value to generate one or more dictionary DGA scores. As one of skill in the art will appreciate, other representations are possible.

Output at step 412 may be used to determine an accuracy score, consistent with the discussion in reference to step 302. In some embodiments, as disclosed in reference to FIG. 1 and in reference to step 302, a testing and validation data set comprising a plurality of domain names and corresponding labels, is passed to deep learning model 400 at step 402 and model output is provided at step 412. An accuracy score may be determined based on a comparison of the labels to the output of step 412. Based on the accuracy score and a predetermined threshold, the further iterations of steps 402-412 may be performed to improve model performance.

In some embodiments, a network device may block, manually or automatically, network traffic to and from a website corresponding to the suspect domain name, based on the dictionary domain generation algorithm score determined at step 412.

Figure 5:
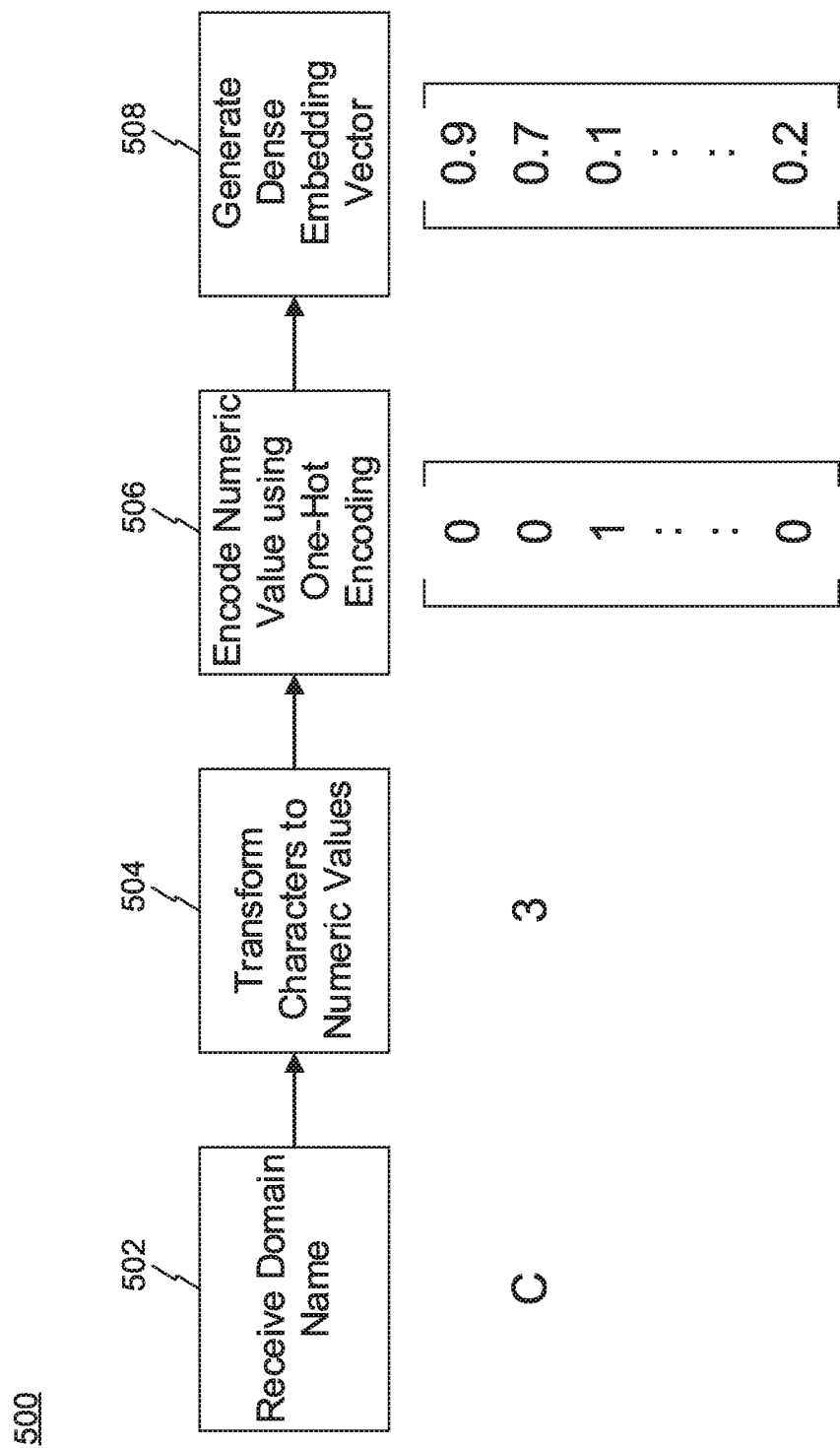
FIG. 5 is a flowchart of an exemplary embedding process for detecting dictionary domain generation algorithm domain names, consistent with disclosed embodiments.

As shown, FIG. 5 is a flowchart of exemplary embedding process 500 for detecting dictionary domain generation algorithm domain names, consistent with disclosed embodiments. The embedding process 500 transforms domain names from a sequence of characters into a sequence of dense embedding vectors. Dense embedding vectors may be used as input data to deep learning models such as the LSTM network of step 406 or the CNN model of step 408. Each intermediate step of process 500 is performed to provide useful input to the subsequent step.

At step 502, a domain name comprising unencoded text is received. For example, the domain name "cats" may be received consisting of "c", "a", "t", and "s."

At optional step 504, the sequence of unencoded characters is transformed into a sequence of numeric values. In the example shown in step 504, "c" is transformed into "3."

At step 506, each numeric value is transformed into a one-hot encoding vector. That is, a sequence of one-hot encoding vectors is generated to be used in later steps of process 500. In some embodiments, step 504 is skipped and the sequence of one-hot encoding vectors is generated directly from the sequence of unencoded characters. One-hot encoding represents categorical data as a vector composed of 0s and 1s indicating whether a given category is present. In the example of step 506, the character "c" is a category of character that is shown to be present by a vector having all 0s except a "1" in the third vector component. In the one-hot encoding vector, there is a vector component for each possible character. In addition, the one-hot encoding vector may comprise a vector component indicating whether the character is a letter, a number, or a special character.

At step 508, a sequence of dense embedding vectors is generated from the one-hot encoding vector, each dense embedding vector corresponding to a character in the original domain name. In some embodiments, the dense embedding vectors are generated by multiplying the sequence of one-hot encoding vectors with a vector of weights. Consistent with disclosed embodiments, the vector of weights may be randomly assigned and subsequently adjusted during training stages of the deep learning models. The dense embedding vectors of step 508 are comprised of vector components, the vector components being real numbers. In some embodiments, each dense embedding vector consists of, for example, 100 vector components. As one of skill in the art will appreciate, dense embedding vectors may be comprised of more or fewer components. In some embodiments, the dense embedding vector components may reflect underlying attributes such as the number of vowels. However, generally, the components of these vectors do not have an inherent, human-understandable meaning but rather capture overall patterns of location and distance between vectors that machine learning identifies at step 508. Accordingly, sequences of dense embedding vectors provide more detailed information to downstream deep learning models at steps 406 and 408 than simple sequences of characters.

FIG. 6 is a flowchart of an exemplary process in an LSTM network 600 for detecting dictionary domain generation algorithm domain names, consistent with disclosed embodiments. LSTM network 600 is a recurrent neural network.

As shown in FIG. 6, LSTM network 600 may comprise loop 602 comprising node A. Node A may be one of a plurality of similar nodes in the LSTM network 600.

Node A may comprise a cell state reflecting an attribute of the sequence of dense embedding vectors and corresponding sequence of characters. For example, the cell state may reflect the number of times a certain sub-sequence of characters appears in a longer sequence of characters. The cell state may reflect the number of vowels in a sequence. The cell state may reflect an arbitrary feature that may not have simple, human-understandable meaning. As one of skill in the art would appreciate, other examples of cell states are possible.

In some embodiments, Node A comprises one or more logic gates. Preferably, node A comprises three gates: a forget gate that determines whether to keep or discard a previous cell state; an input gate that determines which cell state values to update; and an output gate. Node A may belong to any of a variety of classes of LSTM networks and may comprise still other gates, as one of skill in the art will appreciate.

As shown, at each time step i, the neural network receives a dense embedding vector or a single-character input, $x_i$, and produces a corresponding output $h_i$. In the example of FIG. 6, each output $h_i$ may be a number that reflects a feature of a domain name. Features represented by each output $h_i$ may not have any real-world, human-understandable meaning, but rather reflect underlying features of the data as learned by the LSTM network during training.

In the embodiment of FIG. 6, step 602a comprises producing an initial output $h_o$ based on an initial cell state A and a first dense embedding vector $x_o$ in a sequence of dense embedding vectors.

At the next time step 602b, as indicated by a horizontal arrow pointing from A at step 602a to A at step 602b, the loop remembers the cell state of node A. That is, a cell state may persist. At step 602b, the loop receives the next vector in the sequence of dense embedding vectors as input $x_i$. At step 602b, the loop produces output $h_i$.

A process described in reference to step 602b, the process comprising receiving a previous cell state, receiving the next vector in a sequence of dense embedded vectors, and producing an output is repeated at step 602c. The process continues to repeat until terminated at step 602n. In some embodiments, step 602n corresponds to the last vector in a sequence of dense embedded vectors.

FIG. 7 is a flowchart of exemplary process 700 for detecting dictionary DGAs using a CNN model, consistent with disclosed embodiments. Additional details of process 700 are disclosed in reference to FIG. 8.

As shown, process 700 comprises convolution step 702, nonlinear activation function step 704, and pooling step 706.

At step 702, convolution is performed by applying a filter or kernel over a sequence of dense embedding vectors to generate a respective filter output comprising a respective numeric value. As described in reference to FIG. 4 and FIG. 5, the sequence of dense embedding vectors corresponds to a domain name. In some embodiments, a filter is applied until a predetermined accuracy score of the CNN model is achieved. In some embodiments, a filter is applied a predetermined number of iterations like, for example, 60 iterations.

At step 702, a filter may be a sliding window of a fixed character length. For example, the domain "facebook" can be broken down into five four-character windows: "face," "aceb," "cebo," "eboo," and "book." Each four-character window has a corresponding four-vector window of the sequence of dense embedding vectors. A filter may be applied to each four-vector window to obtain a set of filter outputs.

In some embodiments, process 700 comprises applying multiple filters with varying character length windows at step 702, consistent with disclosures made in reference to FIG. 8. For example, process 700 may comprise applying five filters having a respective 2-character, 3-character, 4-character, 5-character, and 6-character window length.

At step 704, the set of filter outputs is passed through a nonlinear activation function to generate a set of activation outputs comprising respective numeric values. For example, the filter output may pass through one of a sigmoid function, tanh, or the rectified linear unit (ReLU).

At step 706, activation outputs are pooled to summarize features from a sequence of dense embedding vectors into a single value. That is, at step 706, the set of activation outputs are aggregated across an entire sequence of dense embedding vectors by summing the activation outputs. For example, a max pooling function may be applied at step 706. The max pooling function may divide the activation outputs into sets and returning the maximum value of each set. As another example, an averaging function may be applied at step 706 by dividing the activation outputs into sets and returning the average value of each set. Activation outputs may be pooled using other, similar functions.

FIG. 8 is a flowchart of exemplary process 700 for detecting dictionary DGA domain names using a CNN model, consistent with disclosed embodiments. FIG. 8 provides additional details of process 700, which is also depicted in FIG. 7.

As depicted in FIG. 8, process 700 may begin with embedding step 802. Embedding step 802 may comprise methods disclosed in reference to step 404 and FIG. 5. That is, embedding step 802 may transform a domain name from a sequence of characters into a sequence of dense embedding vectors. For example, an embedding layer may receive a domain name, transform characters of the domain name into numeric values, encode numeric values as one-hot encoding vectors, and generate a dense embedding vector.

Referring again to FIG. 8, multiple filters of varying window size may be employed at steps 804a-e, corresponding to steps 702 and 704 of FIG. 7. For example, a series of convolutions may be performed by applying a series of filters or kernels over a sequence of dense embedding vectors to generate respective filter outputs comprising a respective numeric value. In steps 804a-n, the respective filter outputs pass through an activation function, as described above in relation to step 704.

Each activation function output may be pooled at steps 806a-e using a sum function or other function as described above in reference to step 706. For example, the activation function outputs may be pooled using a max pooling function or an averaging function. At step 808, pooled results may be concatenated into a large single output matrix for each domain name.

At step 810, a random subset of the concatenated convolutional outputs may be discarded based on a first dropout rate to prevent overfitting data during training. For example, the first dropout rate may be 50%, and 50% of the convolution outputs may be discarded.

At step 812, a first activation function may be applied to the concatenated outputs. In some embodiments, this activation function is a ReLU function.

At step 814, a random subset of the filter outputs may be discarded based on a second dropout rate. For example, the second drop rate may be 20%, and 20% of the convolutional outputs may be discarded.

At step 816, a second activation layer may be applied to the output of the first activation function. In some embodiments, this layer comprises applying a sigmoid function to the output of the first activation function. In some embodiments, the first activation function produces a numeric value that represents a likelihood a domain name was produced by a dictionary DGA, as computed by the CNN model alone. In some embodiments, the results of the first activation function are passed to the MLP model, consistent with disclosures made in reference to step 410.

Figure 9:
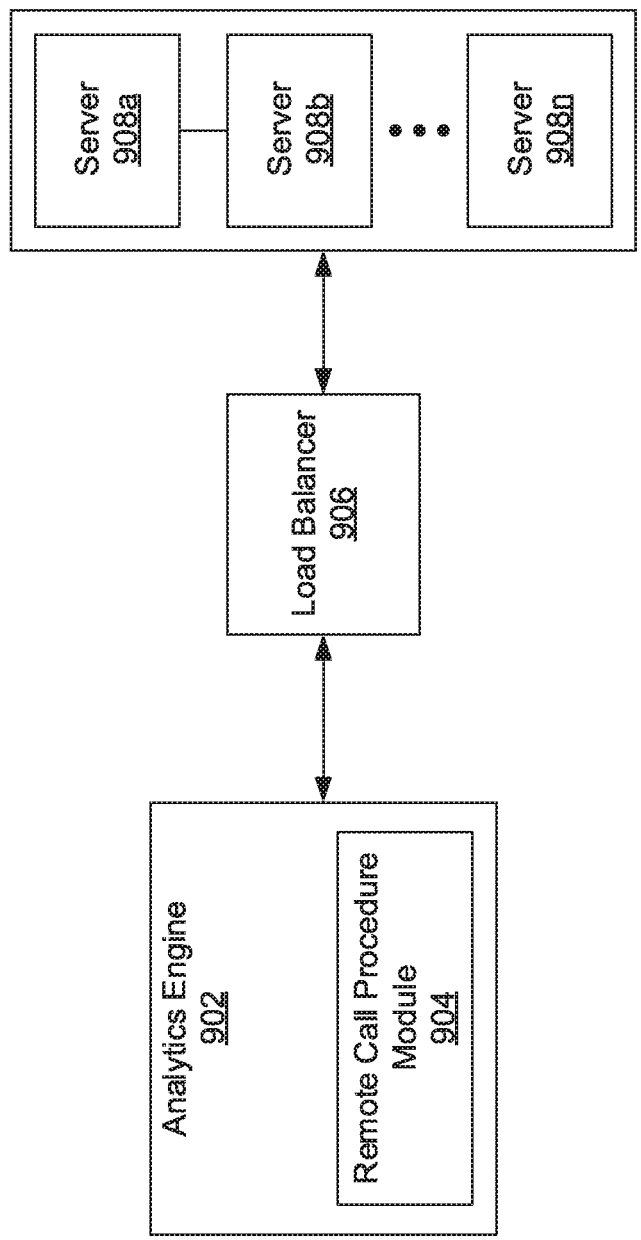
FIG. 9 is an exemplary system for implementing a dictionary domain generation algorithm detector model as a service.

FIG. 9 depicts exemplary system 900 for implementing a dictionary domain generation algorithm detector model as a service.

Consistent with disclosed embodiments, system 900 may be scaled for large-scale data processing in real time. That is, system 900 may be provided as a service that accepts streams of network logs and returns dictionary DGA domain name scores in real time.

The unconventional systems and methods disclosed provide improved dictionary DGA domain name detection as compared to conventional methods. As shown in Table 1, the deep learning model of disclosed embodiments outperforms a standalone LSTM network, a standalone CNN model, a benchmark LSTM approach, and a benchmark random forest model.

TABLE 1

|  | Recall | | | Precision | | | $F_1$ | | | | |
| --- | --- | --- | --- | --- | --- | --- | --- | --- | --- | --- | --- |
|  | matsnu | suppobox | gozi | matsnu | suppobox | gozi | matsnu | suppobox | gozi | TPR | FPR |
| Embodiment | 0.82 | 1.00 | 0.92 | 0.70 | 0.94 | 0.80 | 0.75 | 0.97 | 0.85 | 0.98 | 0.02 |
| LSTM | 0.12 | 0.68 | 0.19 | 1.00 | 1.00 | 1.00 | 0.22 | 0.81 | 0.32 | 0.99 | 0.02 |
| CNN | 0.04 | 0.52 | 0.12 | 1.00 | 1.00 | 1.00 | 0.08 | 0.69 | 0.21 | 0.97 | 0.05 |
| LSTM Benchmark | 0 | 0.32 | N/A | 0 | 1 | N/A | 0 | 0.48 | N/A | N/A | N/A |
| RF Benchmark | 0 | 0 | N/A | 0 | 0 | N/A | 0 | 0 | N/A | N/A | N/A |

As shown in FIG. 9, system 900 may an analytics engine 902. Analytics engine 902 is configured to receive a call from a client device (not shown). The call may comprise a suspect domain name and a request to provide dictionary DGA domain name score associated with the domain name. Analytics engine 902 may be hosted on a local server, a cluster of servers, within the cloud, or another computing system that may be queried. The analytics engine may be built using one of Apache Spark® or a similar analytics engine for processing big data.

Analytics engine 902 may comprise remote call procedure module 904, configured to perform a remote call procedure to load balancer 906. The remote call procedure comprises a sending a message comprising a suspect domain name and receiving a dictionary DGA score in response. In some embodiments, analytics engine 902 provides the dictionary DGA score received from load balancer 906 to a client device.

As shown in FIG. 9, system 900 may comprise load balancer 906, configured to receive a remote call remote call procedure module 904. Load balancer 906 is configured to select one or more of servers 908*a-n* to execute a job, the job comprising running a deep learning model and providing a dictionary DGA score corresponding to the suspect domain name. As one of skill in the art will appreciate, load balancer 906 may use criteria to select one or more of servers 908*a-n* to execute the job. The criteria may comprise at least one of a resource availability, a cost estimate, a time estimate, or other efficiency measure.

Still referring to FIG. 9, system 900 may comprise plurality of servers 908*a-n*. Servers 908*a-n* may comprise one or more processors and one or more memory devices configured to perform operations comprising determining, by a deep learning model, a dictionary DGA score corresponding to the suspect domain name. For example, the deep learning model may determine a dictionary DGA domain name score corresponding to the suspect domain name as disclosed above with respect to FIG. 3 and FIG. 4. Consistent with disclosed embodiments, the deep learning model may comprise an LSTM network, a CNN model, and an MLP model. As will be appreciated by one of skill in the art, servers 908*a-n* may be organized into clusters, each cluster being configured for distributed computing.

Consistent with disclosed embodiments, model results are depicted in Table 1. Briefly, three models were built: (i) a stand-alone LSTM network; (ii) a stand-alone CNN model; and a (iii) an embodiment comprising an LSTM network, a CNN model, and a feedforward model, consistent with the embodiment of FIG. 4. These three models were tested and validated using known dictionary DGA domain names from three malware families: matsnu, gozi, and suppobox. Further, these three models were tested against a previously published LSTM model and Random Forest model (LS™ benchmark and RF benchmark) described in "Predicting Domain Generation Algorithms with Long Short-Term Memory Networks," Jonathan Woodridge et al., available at https://arxiv.org/pdf/1601.00791.pdf.

Table 1 depicts the recall, precision, F1, TPR, and FPR associated with each model and malware family.

Recall measures the completeness of positively labeled instances when considering all dictionary DGA domain name scores and is defined as:

$$\frac{\Sigma \text{ True Postive}}{\Sigma \text{ True Positive} + \Sigma \text{ False Negative}}$$

Precision measures the purity of all positively labeled instances and is defined:

$$\frac{\Sigma \text{True Postive}}{\Sigma \text{ True Positive} + \Sigma \text{ False Positive}}$$

The F1 scores is the harmonic mean of precision and recall:

$$2 * \frac{\text{Precision} * \text{Recall}}{\text{Precision} + \text{Recall}}$$

The True Positive Rate (TPR) considers a subset of all domain names that return a dictionary DGA domain name score above a predetermined threshold and, within that subset, is defined as:

$$\frac{\Sigma \text{True Postive}}{\Sigma \text{True Positive} + \Sigma \text{False Negative}}$$

The False Positive Rate (FPR) is defined as:

$$\frac{\Sigma \text{True Postive}}{\Sigma \text{False Positive} + \Sigma \text{True Negative}}$$

As shown in Table 1, where metrics are available, the deep learning model of disclosed embodiments outperforms the standalone LSTM network, the standalone CNN model, the benchmark LSTM approach, and the benchmark random forest model.

Systems and methods disclosed herein involve unconventional improvements over conventional approaches to detecting dictionary DGA domain names. As compared to conventional technologies, embodiments of the invention improve accuracy and may be offered as a service.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for detecting dictionary domain generation algorithm domain names comprising:
   one or more hardware processors; and
   a memory unit storing instructions executable by the one or more hardware processors to perform operations comprising:
     receiving a plurality of training domain names, each comprising a corresponding sequence of characters;
     receiving a plurality of labels respectively corresponding to the plurality of training domain names;
     generating a plurality of sequences of dense embedding vectors each corresponding to one of the training domain names and based on a sequence of characters corresponding to the training domain name, wherein generating a dense embedding vector comprises:
       generating a sequence of numbers based on a sequence of characters corresponding to one of the training domain names;
       generating a sequence of one-hot encoding vectors based on the sequence of numbers; and
       generating a sequence of dense embedding vectors by multiplying the one-hot encoding vectors with a vector of weights;
     generating a plurality of multilayer perceptron (MLP) node outputs by iteratively performing optimization steps comprising:
       generating, using a long short-term memory model, a plurality of neural node outputs based on the plurality of sequences of dense embedding vectors and the plurality of labels;
       generating, using a convolutional neural network model, a plurality of filter outputs based on the plurality of sequences of dense embedding vectors and the plurality of labels;
       generating the MLP node outputs using a feedforward neural network model comprising an input layer, the input layer comprising the neural node outputs and the filter outputs;
       determining an accuracy score of the MLP node outputs; and
       based on the determined accuracy score and a threshold, performing one of:
         terminating the iteratively performed optimization steps; or
         modifying at least one of the long short-term memory model, the convolutional neural network model, or the feedforward neural network model;
     receiving a suspect domain name; and
     providing a dictionary domain generation algorithm score based on the plurality of MLP node outputs and the suspect domain name.

2. The system of claim 1, wherein generating the plurality of sequences of dense embedding vectors comprises:
   generating a sequence of numbers based on a sequence of characters corresponding to one of the training domain names;
   generating a sequence of encoding vectors based on the sequence of numbers; and
   generating the plurality of sequences of dense embedding vectors.

3. The system of claim 1, wherein generating, using a long short-term memory model, a plurality of neural node outputs comprises:
   creating a neural node comprising a cell, the cell having an initial cell state and comprising a logic gate;
   selecting a sequence of dense embedding vectors from among the plurality of sequences of dense embedding vectors;

identifying, from among the plurality of labels, the label corresponding to the selected sequence of dense embedded vectors;

for each dense embedding vector in the selected sequence of dense embedding vectors, sequentially:

maintaining, forgetting, or changing the cell state based on the current cell state, the logic gate, and the dense embedding vector; and generating a neural node output based on the cell state and the label corresponding to the selected sequence of dense embedding vectors.

4. The system of claim 1, wherein a number of neural nodes of the long short-term memory model is more than 500.

5. The system of claim 1, wherein generating, using a convolutional neural network model, a plurality of filter outputs comprises:

creating a plurality of convolution filters, each convolution filter having a sliding window of a fixed character length;

generating, based on the plurality of sequences of dense embedding vectors and the plurality of labels, a plurality of convolution outputs corresponding to each convolution filter;

pooling the convolution outputs corresponding to each convolution filter;

concatenating the pooled convolution outputs;

discarding a random subset of the concatenated convolution outputs based on a first dropout rate;

generating a plurality of filter outputs using non-linear rectified linear unit activation on the concatenated convolution outputs; and discarding a random subset of the filter outputs based on a second dropout rate.

6. The system of claim 5, further comprising five convolution filters;

wherein the fixed character length of each convolution filter is more than one character and less than seven characters.

7. The system of claim 1, wherein:

the feedforward model comprises a plurality of nodes, each node having a weight and a transformation; and modifying the feedforward model comprises one of modifying a weight or modifying a transformation.

8. The system of claim 1, further comprising:

receiving a plurality of additional training domain names, each comprising a corresponding sequence of characters;

receiving a plurality of additional labels respectively corresponding to the plurality of additional training domain names;

generating a plurality of additional sequences of dense embedding vectors each corresponding to one of the additional training domain names and based on the corresponding sequence of characters; and generating a plurality of additional MLP node outputs by iteratively performing additional optimization steps comprising:

generating, using the long short-term memory model, a plurality of additional neural node outputs based on the plurality of additional sequences of dense embedding vectors and the plurality of additional labels;

generating, using the convolutional neural network model, a plurality of additional filter outputs based on the plurality of additional sequences of dense embedding vectors and the plurality of labels;

generating, using a feedforward neural network model, the plurality of additional MLP node outputs based on the additional neural node outputs and the additional filter outputs;

determining an additional accuracy score of the additional MLP node outputs; and based on the determined additional accuracy score and the threshold, performing one of:

terminating the iteratively performed additional optimization steps; or modifying at least one of the long short-term memory model, the convolutional neural network model, or the feedforward neural network model.

9. The system of claim 1, wherein each of the plurality of sequences of dense embedding vectors has the same sequence length.

10. The system of claim 1 wherein:

determining the accuracy score comprises at least one of determining a false positive rate or determining a false negative rate; and the accuracy score is based on at least one of the false positive rate or the false negative rate.

11. The system of claim 1, wherein at least one of the suspect domain names is comprised of two concatenated English words.

12. The system of claim 1, wherein at least one of the suspect domain names is comprised of two concatenated non-English words.

13. The system of claim 1, wherein the system is implemented on one or more servers.

14. The system of claim 1, wherein the system is implemented on a user device.

15. The system of claim 1, wherein:

receiving the plurality of training domain names comprises receiving, from a public server, the plurality of training domain names; and receiving the plurality of labels comprises receiving, from the public server, the plurality of labels.

16. The system of claim 1, the operations further comprising:

blocking, based on the dictionary domain generation algorithm score, network traffic to and from a website corresponding to the suspect domain name.

17. The system of claim 1, the operations further comprising:

identifying a file on a user device, the file comprising instructions to contact a website corresponding to the suspect domain name; and deleting the file.

18. The system of claim 1, wherein receiving a suspect domain name comprises:

receiving a network log; and extracting the suspect domain name from the network log.

19. A method for detecting dictionary domain generation algorithm domain names comprising:

receiving a plurality of training domain names, each comprising a corresponding sequence of characters;

receiving a plurality of labels corresponding to the plurality of training domain names;

generating a plurality of sequences of dense embedding vectors, each corresponding to a training domain name and based on sequence of characters corresponding to the training domain name, wherein generating a dense embedding vector comprises:

generating a sequence of numbers based on a sequence of characters corresponding to one of the training domain names;

generating a sequence of one-hot encoding vectors based on the sequence of numbers; and generating a sequence of dense embedding vectors by multiplying the one-hot encoding vectors with a vector of weights;

generating a plurality of multilayer perceptron (MLP) node outputs by iteratively performing optimization steps comprising:

generating, using a long short-term memory model, a plurality of neural node outputs based on the plurality of sequences of dense embedding vectors and the plurality of labels;

generating, using a convolutional neural network model, a plurality of filter outputs based on the plurality of sequences of dense embedding vectors and the plurality of labels;

generating the MLP node outputs using a feedforward neural network model comprising an input layer, the input layer comprising the neural node outputs and the filter outputs;

determining an accuracy score of the MLP node outputs; and based on the determined accuracy score and a threshold, performing one of:

terminating the iteratively performed optimization steps; or modifying at least one of the long short-term memory model, the convolution neural network model, or the feedforward neural network model;

receiving a suspect domain name; and providing a dictionary domain generation algorithm score based on the plurality of MLP node outputs and the suspect domain name.

* * * * *